US008537232B2

(12) United States Patent
Uchihashi

(10) Patent No.: US 8,537,232 B2
(45) Date of Patent: Sep. 17, 2013

(54) IMAGE PROCESSING APPARATUS, IMAGE PROCESSING SYSTEM AND COMPUTER READABLE MEDIUM

(75) Inventor: Shingo Uchihashi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 370 days.

(21) Appl. No.: 12/537,366

(22) Filed: Aug. 7, 2009

(65) Prior Publication Data

US 2010/0085441 A1  Apr. 8, 2010

(30) Foreign Application Priority Data

Oct. 8, 2008 (JP) ................................ 2008-261963

(51) Int. Cl.
 *H04N 5/228* (2006.01)
(52) U.S. Cl.
 USPC ...................... 348/222.1; 348/14.08; 348/600
(58) Field of Classification Search
 USPC ................................. 348/14.1; 382/302, 304
 See application file for complete search history.

(56) References Cited

U.S. PATENT DOCUMENTS

| 5,638,114 | A | * | 6/1997 | Hatanaka et al. | ........... | 348/14.09 |
| 6,018,596 | A | * | 1/2000 | Wilkinson | ........... | 382/260 |
| 6,211,902 | B1 | * | 4/2001 | Tanoi | ........... | 348/14.09 |
| 7,023,452 | B2 | * | 4/2006 | Oshiyama et al. | ........... | 345/635 |
| 2004/0179556 | A1 | * | 9/2004 | Kobayashi et al. | ........... | 370/535 |
| 2004/0196370 | A1 | | 10/2004 | Yaegashi | | |
| 2004/0223003 | A1 | * | 11/2004 | Heirich et al. | ........... | 345/629 |
| 2006/0274389 | A1 | * | 12/2006 | Inukai | ........... | 358/530 |

FOREIGN PATENT DOCUMENTS

| JP | 6-296278 A | 10/1994 |
| JP | 10-276323 A | 10/1998 |
| JP | 2004-312267 A | 11/2004 |
| JP | 2006-123321 A | 5/2006 |
| JP | 2007-207190 A | 8/2007 |

OTHER PUBLICATIONS

Notification of Reasons for Refusal issued Jul. 13, 2010, in counterpart Japanese Application No. 2008-261963.

\* cited by examiner

*Primary Examiner* — Roberto Velez
*Assistant Examiner* — Abdelaaziz Tissire
(74) *Attorney, Agent, or Firm* — Sughrue Mion, PLLC

(57) ABSTRACT

An image processing apparatus includes: an allocating unit that divides image information into components corresponding to the number of a plurality of apparatuses and allocates the components to the plurality of apparatuses; a information acquiring unit that acquires information of the allocated components from image information being reproduced by the plurality of apparatuses; and an image generating unit that combines the information of the components acquired from the plurality of apparatuses by the information acquiring unit and generates an image.

18 Claims, 14 Drawing Sheets

FIG. 3A

| NODE | TIME | COMPONENT (COLOR COMPONENT) |
|---|---|---|
| 1 | $T_1$ | RED (R) |
| 2 | $T_1$ | GREEN (G) |
| 3 | $T_1$ | BLUE (B) |
| | | |

FIG. 3B

| NODE | TIME | COMPONENT (COLOR COMPONENT) |
|---|---|---|
| 1 | $T_1$ | RED (R) |
| 2 | $T_1$ | GREEN (G) |
| 3 | $T_1$ | BLUE (B) |
| 1 | $T_2$ | GREEN (G) |
| 2 | $T_2$ | BLUE (B) |
| 3 | $T_2$ | RED (R) |
| 1 | $T_3$ | BLUE (B) |
| 2 | $T_3$ | RED (R) |
| 3 | $T_3$ | GREEN (G) |
| | | |

| NODE | TIME | COMPONENT (IMAGE REGION) |
|---|---|---|
| 1 | $T_i$ | $L(N \cdot j+1)$ |
| 2 | $T_i$ | $L(N \cdot j+2)$ |
| 3 | $T_i$ | $L(N \cdot j+3)$ |
| 4 | $T_i$ | $L(N \cdot j+4)$ |
| 5 | $T_i$ | $L(N \cdot j+5)$ |
| ⋮ | ⋮ | ⋮ |
| N | $T_i$ | $L(N \cdot j+N)$ |

| NODE | TIME | COMPONENT (SPATIAL FREQUENCY COMPONENT) |
|---|---|---|
| 1 | $T_1$ | A |
| 2 | $T_1$ | B |
| 3 | $T_1$ | C |
| 4 | $T_1$ | D |

FIG. 6

| NODE | TIME | COMPONENT (COLOR COMPONENT) × (SPATIAL FREQUENCY COMPONENT) |
|---|---|---|
| 1 | $T_1$ | RED × REGION A |
| 2 | $T_1$ | RED × REGION B |
| 3 | $T_1$ | RED × REGION C |
| 4 | $T_1$ | RED × REGION D |
| 5 | $T_1$ | GREEN × REGION A |
| 6 | $T_1$ | GREEN × REGION B |
| 7 | $T_1$ | GREEN × REGION C |
| 8 | $T_1$ | GREEN × REGION D |
| 9 | $T_1$ | BLUE × REGION A |
| 10 | $T_1$ | BLUE × REGION B |
| 11 | $T_1$ | BLUE × REGION C |
| 12 | $T_1$ | BLUE × REGION D |

NODE 1
NODE 2
NODE 3
NODE 4

NODE 1
NODE 2
NODE 3
NODE 4

IMAGE PROCESSING APPARATUS, IMAGE PROCESSING SYSTEM AND COMPUTER READABLE MEDIUM

CROSS-REFERENCE TO RELATED APPLICATIONS

This application is based on and claims priority under 35 USC 119 from Japanese Patent Application No. 2008-261963 filed Oct. 8, 2008.

BACKGROUND

1. Technical Field

The present invention relates to an image processing apparatus, an image processing system and a computer readable medium.

2. Related Art

With the development of computers and networks, many techniques for communication between different places have been developed. One of these techniques is a video conference technique that performs a conference while displaying common information on the screens of a plurality of apparatuses. In the video conference, each user should communicate with other users while referring to the same image in order to express the user's opinion.

SUMMARY

According to an aspect of the invention, an image processing apparatus includes: an allocating unit that divides image information into components corresponding to the number of a plurality of apparatuses and allocates the components to the plurality of apparatuses; a information acquiring unit that acquires information of the allocated components from image information being reproduced by the plurality of apparatuses; and an image generating unit that combines the information of the components acquired from the plurality of apparatuses by the information acquiring unit and generates an image.

BRIEF DESCRIPTION OF THE DRAWINGS

Exemplary embodiment(s) of the present invention will be described in detail based on the following figures, wherein:

FIG. 3A and FIG. 3B are diagrams for illustrating an example of an allocation information table;

FIG. 6 is a diagram illustrating an example of the allocation information table;

DETAILED DESCRIPTION

Hereinafter, exemplary embodiments of the invention will be described with reference to the accompanying drawings.

Figure 1:
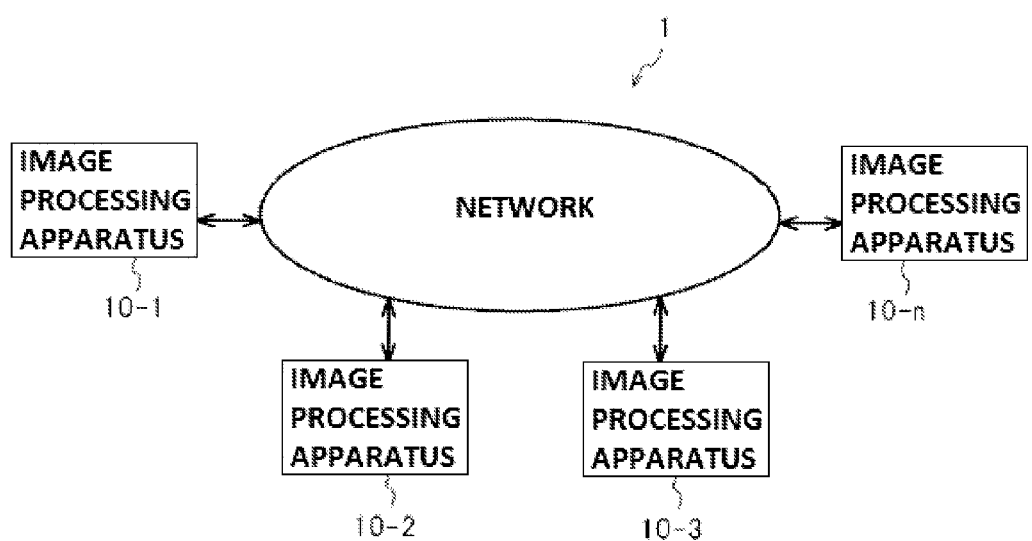
FIG. 1 is a diagram illustrating the structure of an image processing system according to an exemplary embodiment of the invention.

FIG. 1 is a diagram illustrating the structure of an image processing system 1 according to an exemplary embodiment of the invention. As shown in FIG. 1, the image processing system 1 includes a plurality of image processing apparatuses 10 (10-1 to 10-n). The image processing apparatuses 10 are connected such that they can communicate with each other through a network. Each of the image processing apparatuses 10 is implemented by a computer having hardware components, such as a central processing unit (CPU), a storage device (memory), and a network interface.

Figure 2:
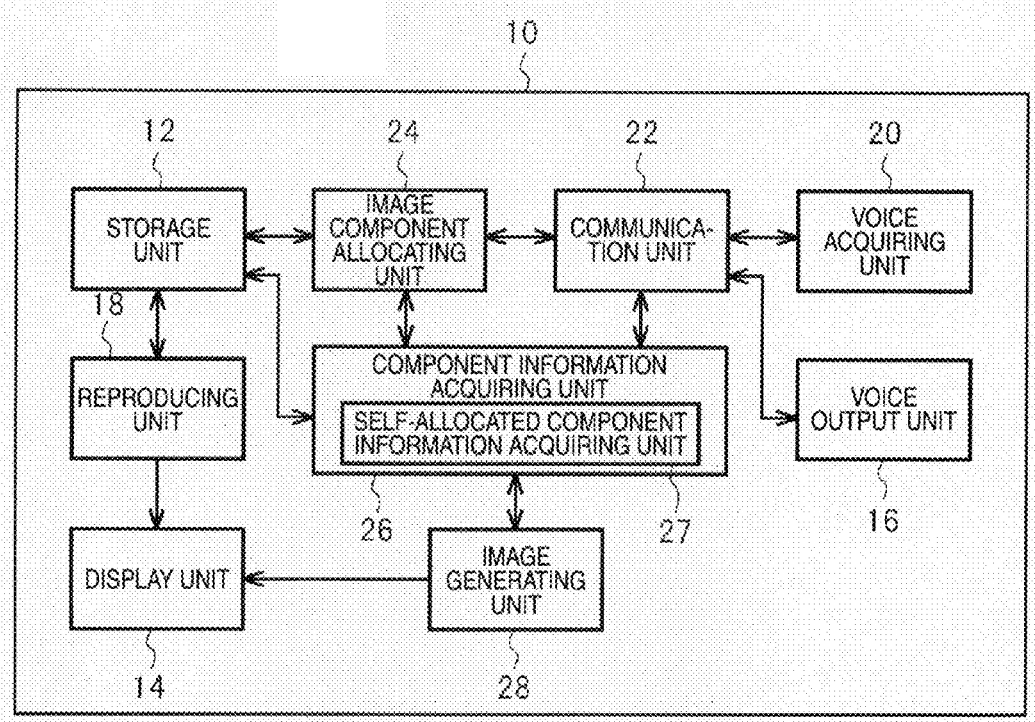
FIG. 2 is a functional block diagram illustrating an image processing apparatus.

FIG. 2 is a functional block diagram illustrating the image processing apparatus 10. In this exemplary embodiment, the image processing apparatuses 10 have the same structure. As shown in FIG. 2, the image processing apparatus 10 includes a storage unit 12, a display unit 14, a voice output unit 16, a reproducing unit 18, a voice acquiring unit 20, a communication unit 22, an image component allocating unit 24, a component information acquiring unit (first information acquiring unit) 26, and an image generating unit 28. A program stored in a computer-readable information storage medium may be read to the image processing apparatus 10, which is a computer system, by a medium reading device (not shown), and the image processing apparatus 10 may execute the program to implement the functions of the above-mentioned units. In addition, the program may be supplied to the image processing apparatus 10 by an information storage medium or through a data communication network such as the Internet.

The storage unit 12 includes a storage device, such as a semiconductor memory or a magnetic disk, and stores data or programs. In this exemplary embodiment, the storage unit 12 stores data for displaying images (for example, still picture data, moving picture data, and application data for displaying a slide show) and data reproducing programs for reproducing the data. The still picture data may be image data of a bitmap format or image data of a compression format such as JPEG. The moving picture data may be data of a MPEG format. The application data may be data of a presentation program that sequentially displays one or a plurality of slide shows, or other application data for controlling the display unit 14 to display images.

The display unit 14 includes a display, and displays images on the basis of input image data.

The voice output unit 16 includes a speaker, and outputs a voice on the basis of input voice data.

The reproducing unit 18 reproduces data according to the data reproducing program stored in the storage unit 12. For example, when data is still picture data, the reproducing unit 18 generates image data on the basis of the still picture data and outputs the image data to the display unit 14. When data is moving picture data, the reproducing unit 18 sequentially outputs image data to the display unit 14 on the basis of the moving picture data, and sequentially outputs the stored voice data to the voice output unit 16 in synchronization with the image data.

The voice acquiring unit 20 includes a sound collecting device, such as a microphone, and collects a voice generated from the user of the image processing apparatus 10 to acquire voice data. The voice acquiring unit 20 outputs the acquired voice data to the communication unit 22.

The communication unit 22 includes a network interface. The communication unit 22 is connected to a network through the network interface and performs data communication with other image processing apparatuses 10 connected to the network. In this exemplary embodiment, the communication unit 22 transmits voice data input from the voice acquiring unit 20 to other image processing apparatuses 10. In addition, the communication unit 22 receives voice data transmitted from other image processing apparatuses 10, and outputs the received voice data to the voice output unit 16. The voice output unit 16 outputs a voice on the basis of the voice data input from the communication unit 22.

The above-mentioned functions enable the user of the image processing apparatus 10 to communicate with the users of other image processing apparatuses 10 through the network while displaying, for example, the image data stored in the storage unit 12 on the display unit 14. In this case, each user checks whether the images displayed on the screens of the image processing apparatuses 10 operated by other users are identical to each other such that communication discrepancy between the users does not occur. Next, a process of checking the identity of the image data displayed on the display units 14 of the image processing apparatuses 10 will be described. In this exemplary embodiment, the image processing apparatus 10 that starts the identity check process is referred to as a main node, and the image processing apparatus 10 that performs a process in response to requests from the main node is referred to as a sub-node.

First, a process performed by the image component allocating unit 24 of the image processing apparatus 10, which is the main node, will be described. The image component allocating unit 24 divides image information into components corresponding to the number of image processing apparatuses 10 to be subjected to the identity check process, and allocates the divided components of the image information to the image processing apparatuses 10. That is, the image component allocating unit 24 divides one image information item into a plurality of complementary components, and allocates the divided components to the image processing apparatuses 10. In this case, the number of components may be equal to the number of image processing apparatuses 10, which are the main node and the sub-nodes. Next, first to fourth methods of dividing and allocating the components of an image using the image component allocating unit 24 will be described.

In the first method, the image information is divided into components based on color components, and the components are allocated to the image processing apparatuses. FIG. 3A is an allocation information table showing allocation information including red (R), green (G), and blue (B) of image information allocated to the image processing apparatuses 10 when there are three image processing apparatuses 10 to be subjected to an identity check process. As shown in FIG. 3A, the allocation information table stores time as well as color components. Each of the image processing apparatuses 10 acquires the image information of the color components associated with the time in the image reproduced by the reproducing unit 18 at the stored time. The color components allocated to the image processing apparatuses 10 may be fixed. Alternatively, the color components allocated to the image processing apparatuses 10 may be changed with time, as shown in FIG. 3B.

Figures 4A, 4B:
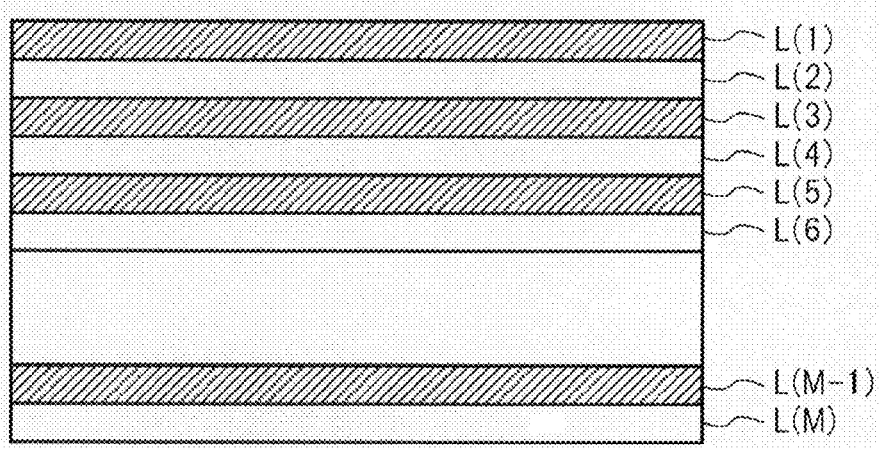
FIG. 4A and FIG. 4B are diagrams for illustrating an example of the allocation information table.

In the second method, image information is divided into components based on image regions, and the image regions are allocated to the image processing apparatuses 10. FIG. 4A shows an allocation information table indicating allocation information including the image regions allocated to the image processing apparatuses 10 to be subjected to the identity check process. As shown in FIG. 4B, when there are N image processing apparatuses 10 to be subjected to the identity check process, an $(N \cdot j+i)$-th scanning line $L(N \cdot j+i)$ (where j is an integer equal to greater than 0) from the upper side of image information may be allocated to the image processing apparatus 10, which is a node i (i=1, 2, 3, ..., N).

The method of allocating the image regions to the image processing apparatuses 10 is not limited to the above. For example, p×q image regions obtained by dividing an image into p rows and q columns may be allocated to the image processing apparatuses 10. In this case, p and q satisfy $N=p \cdot q$ when the number of image processing apparatuses 10 to be subjected to the identity check process is N. In addition, two or more image regions may be allocated to one image processing apparatus 10.

Figures 5A, 5B:
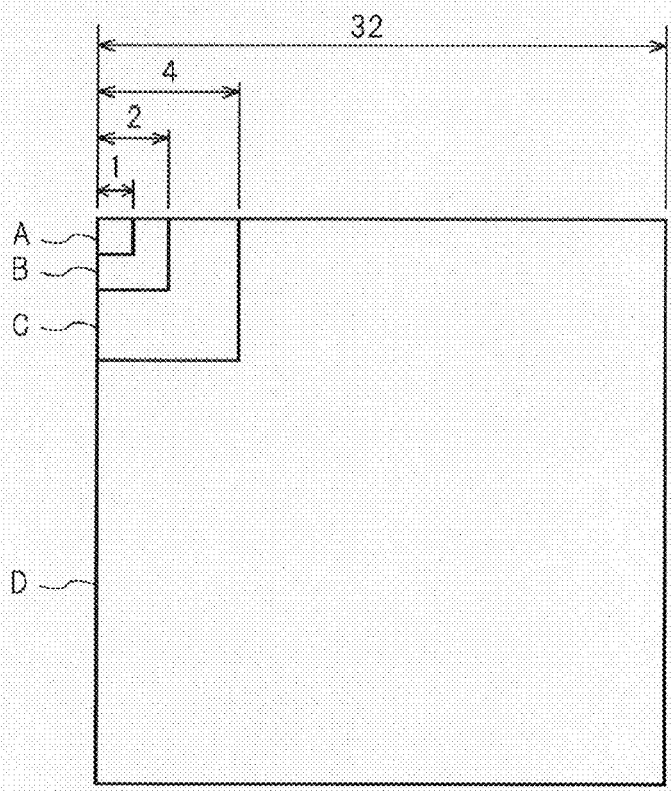
FIG. 5A and FIG. 5B are diagrams for illustrating an example of the allocation information table.

In the third method, image information is divided into components based on spatial frequency components, and the spatial frequency components are allocated to the image processing apparatuses 10. FIG. 5A is an allocation information table showing the spatial frequency components allocated to the image processing apparatuses 10 to be subjected to the identity check process. When the spatial frequency components are allocated, first, the image information is converted into the spatial frequency component. In this case, in order to convert the image information into the spatial frequency component, for example, an image may be divided into blocks composed of 32×32 pixels, and DCT conversion may be performed on each of the blocks. In this exemplary embodiment, the higher the spatial frequency component is, the larger a region is to be allocated in the above-mentioned block. Specifically, as shown in FIG. 5B, when the spatial frequency components are allocated to four image processing apparatuses 10, the image information of a region A corresponding to the spatial frequency component of one pixel is allocated to the first node, the image information of a region B corresponding to the spatial frequency component of 3 pixels is allocated to the second node, the image information of a region C corresponding to the spatial frequency component of 12 pixels is allocated to the third node, and the image information of a region D corresponding to the spatial frequency component of 1008 pixels is allocated to the fourth node, in the DCT-converted blocks. As such, the reason why a larger region is allocated for the higher frequency component, in other words, why a broadband spatial frequency is allocated for it, is that the image information of the higher spatial frequency component has more difficulties in being recognized.

In the fourth method, image information is divided into components, which are combinations of a plurality of elements included in the color component, the image region, and the spatial frequency component, and the components are allocated to the image processing apparatuses 10. FIG. 6 shows an allocation information table including 12 components, which are combinations of three color components and four spatial frequency components and are divided from image information, allocated to the image processing apparatuses 10. The combinations of the components are not limited to the above, but other combinations of components may be used.

The allocation information (allocation information table) indicating the information of the components allocated to the image processing apparatuses 10 by the image component allocating unit 24 is transmitted to each of the image processing apparatuses 10 by the communication unit 22. Then, each of the image processing apparatuses 10 receives the allocation information transmitted from the image processing apparatus 10, which is the main node.

Each of the image processing apparatuses 10, which are the sub-nodes, acquires the information of the component allocated thereto on the basis of the received allocation information. In this case, the information of the self-allocated component is acquired by the self-allocated component information acquiring unit 27 (second information acquiring unit) included in the component information acquiring unit 26. In addition, the self-allocated component information acquiring unit 27 of the image processing apparatus 10, which is the main node, acquires the information of the self-allocated component.

The self-allocated component information acquiring unit 27 sets the allocated component on the basis of the received allocation information, and acquires the information of the set component from the image information reproduced by the reproducing unit 18. For example, when a color component is allocated to each of the image processing apparatuses 10, the image processing apparatus 10, which is a node 1, captures the reproduced image data on the basis of the allocation information, and extracts and acquires the image information of a red (R) component from the captured image data. Similarly, the image processing apparatus 10, which is a node 2, extracts and acquires the image information of a green (G) component from the reproduced image data, and the image processing apparatus 10, which is a node 3, extracts and acquires the image information of a blue (B) component from the reproduced image data.

Then, each of the image processing apparatuses 10, which are the sub-nodes, transmits the information of the component acquired by the self-allocated component information acquiring unit 27 to the image processing apparatus 10, which is the main node, using the communication unit 22. The image processing apparatus 10, which is the main node, receives and acquires the information of the component transmitted from each of the image processing apparatuses 10, which are the sub-nodes.

The image generating unit 28 combines the information of the components received from the image processing apparatuses 10 and reconstructs a reproduction image to generate a reconstruction image. For example, when a color component is allocated to each of the image processing apparatuses 10, the image generating unit 28 combines the self-extracted red (R) image data, the green (G) image data received from the node 2, and the blue (B) image data received from the node 3 to generate a reconstruction image.

The display unit 14 displays the reconstruction image generated by the image generating unit 28. FIG. 7B, FIG. 8B, FIG. 9B, FIG. 10B and FIGS. 11A to 11E show examples of the reconstruction image generated by the image generating unit 28.

Figure 7A:
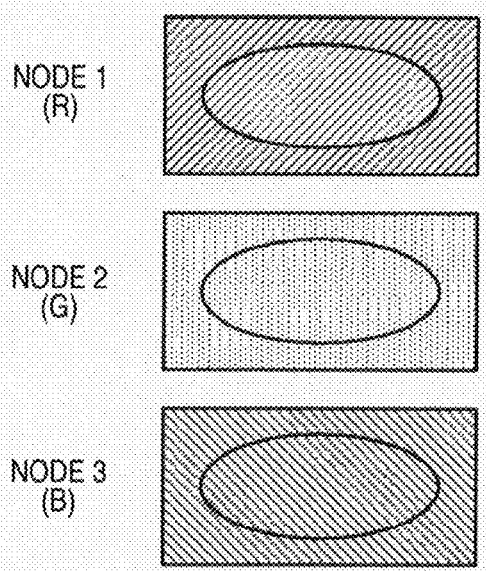
FIG. 7A and FIG. 7B are diagrams for illustrating an example of a reconstruction image.

FIGS. 7A to 8B show examples of the reconstruction image obtained by acquiring the image information of the color components allocated to the image processing apparatuses 10, which are the nodes 1 to 3, on the basis of the allocation information shown in FIG. 3A (or FIG. 3B) and combining the acquired image information. FIG. 7A and FIG. 8A each shows the images of R, G, and B color components acquired by the image processing apparatuses 10, which are the nodes 1 to 3. And FIG. 7A and FIG. 8B each show the reconstruction image obtained by combining the image information of the color components.

Figure 7B:
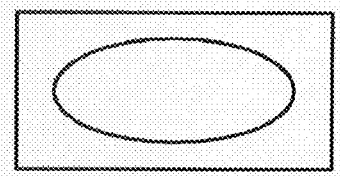
Figure 8A:
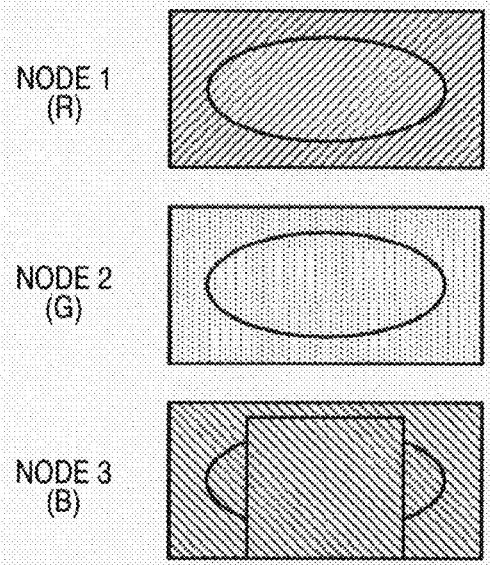
FIG. 8A and FIG. 8B are diagrams for illustrating an example of the reconstruction image.
Figure 8B:
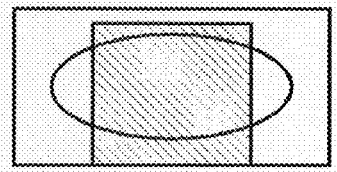

As shown from FIG. 7A and FIG. 7B, when the images reproduced by the image processing apparatuses 10 are identical to each other, the reconstruction image obtained by allocating color components and reconstructing the color components is substantially the same as the original reproduction image. As shown from FIG. 8A and FIG. 8B, when the image reproduced by at least one image processing apparatus 10 is different from those reproduced by other image processing apparatuses 10, the generated reconstruction image is different from the original reproduction image.

Figure 9A:
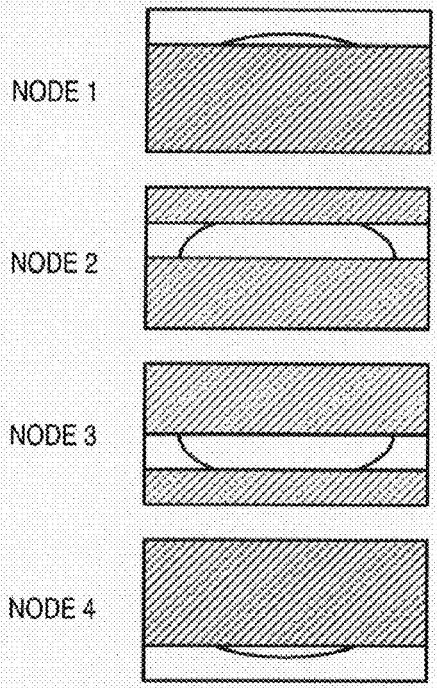
FIG. 9A and FIG. 9B are diagrams for illustrating an example of the reconstruction image.

FIGS. 9A to 10B show examples of the reconstruction image obtained by acquiring the image information of the image regions allocated to the image processing apparatuses 10, which are the nodes 1 to 4, on the basis of the allocation information shown in FIG. 4A and reconstructing the acquired image information. FIG. 9A and FIG. 10A each shows the image information of the image regions acquired by the image processing apparatuses 10, which are the nodes 1 to 4. And FIG. 9B and FIG. 10B each shows the reconstruction image obtained by reconstructing the image information of the image regions.

Figure 9B:
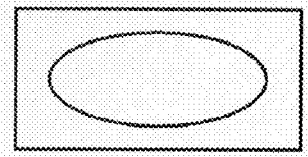
Figure 10A:
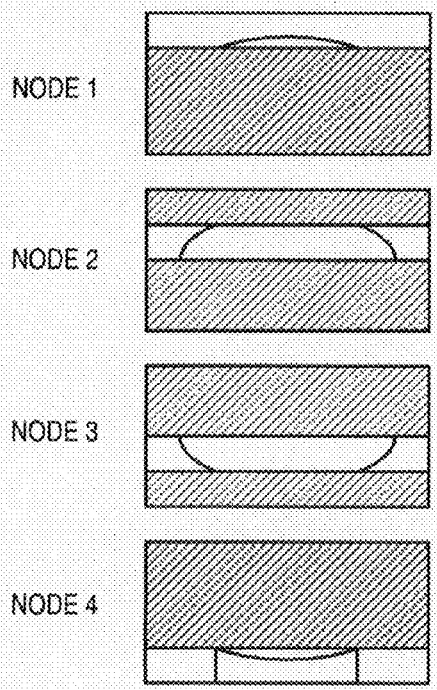
FIG. 10A and FIG. 10B are diagrams for illustrating an example of the reconstruction image.
Figure 10B:
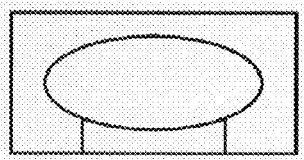

As shown from FIG. 9A and FIG. 9B, when the images reproduced by the image processing apparatuses 10 are identical to each other, the reconstruction image obtained by allocating image regions and reconstructing the image regions is substantially the same as the original reproduction image. As shown from FIG. 10A and FIG. 10B, when the image reproduced by at least one image processing apparatus 10 is different from those reproduced by other image processing apparatuses 10, the generated reconstruction image is different from the reproduction image.

Figure 11A:
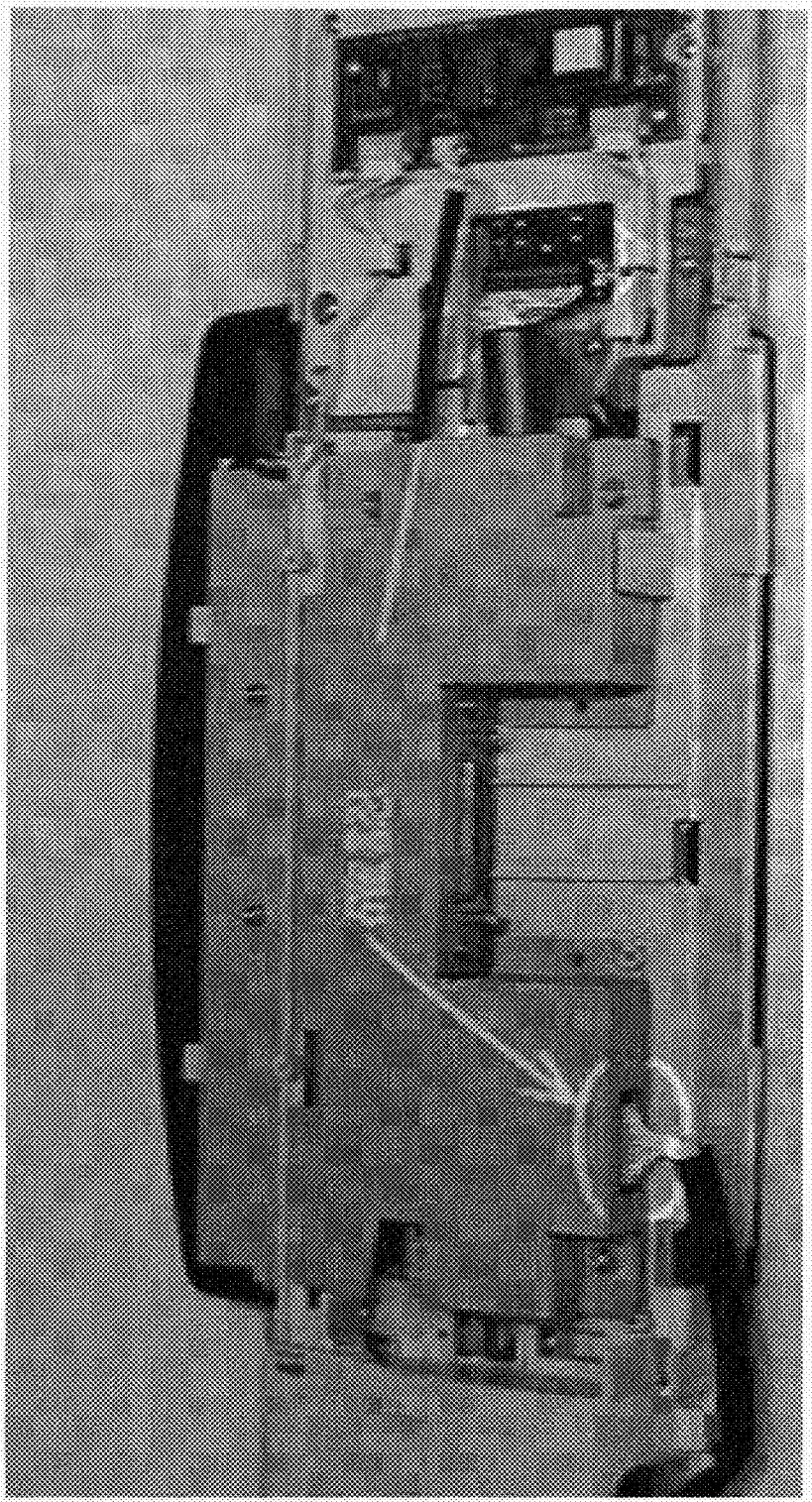
FIGS. 11A to 11E are diagrams for illustrating an example of the reconstruction image.
Figure 11B:
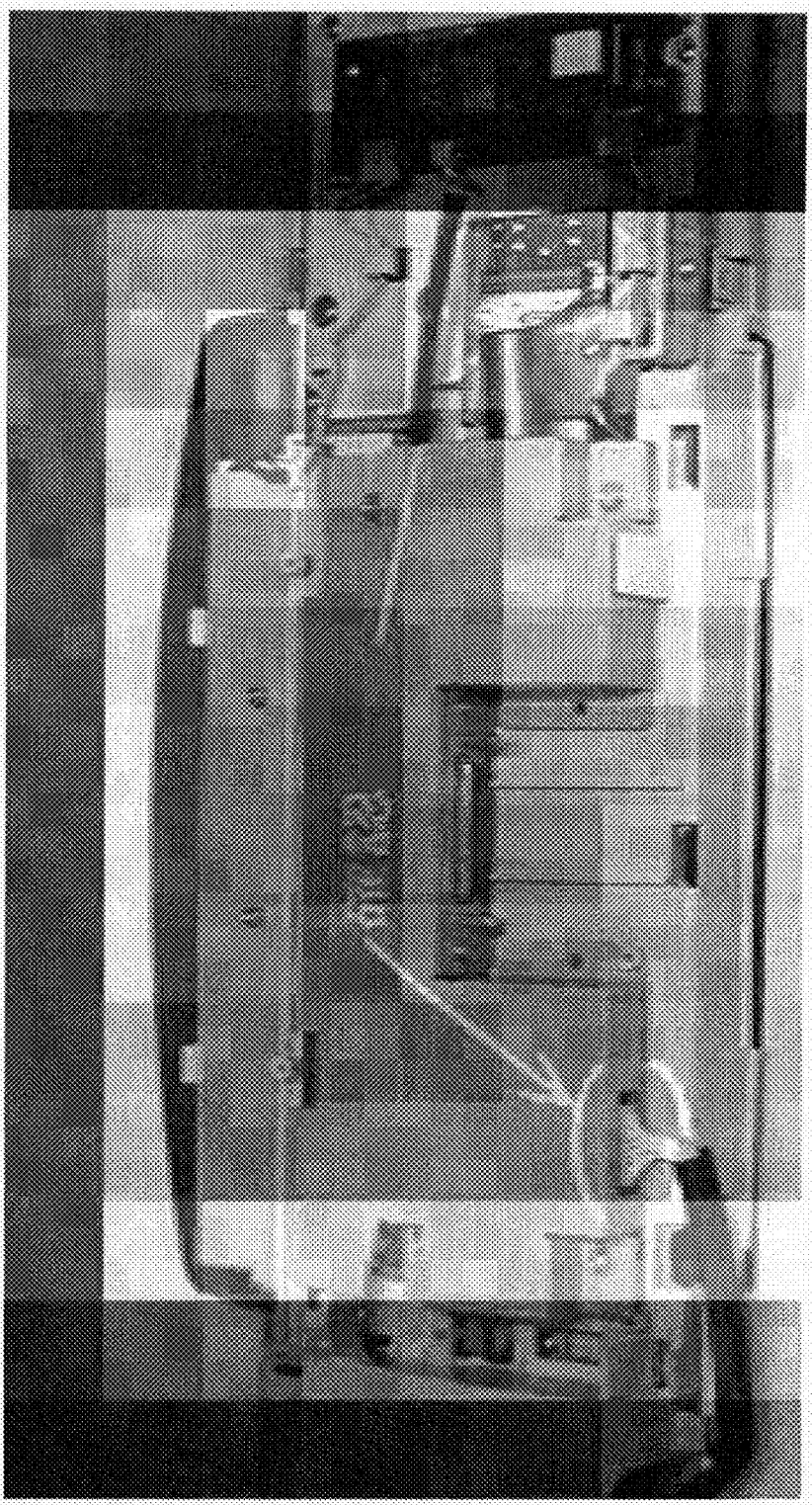
Figure 11C:
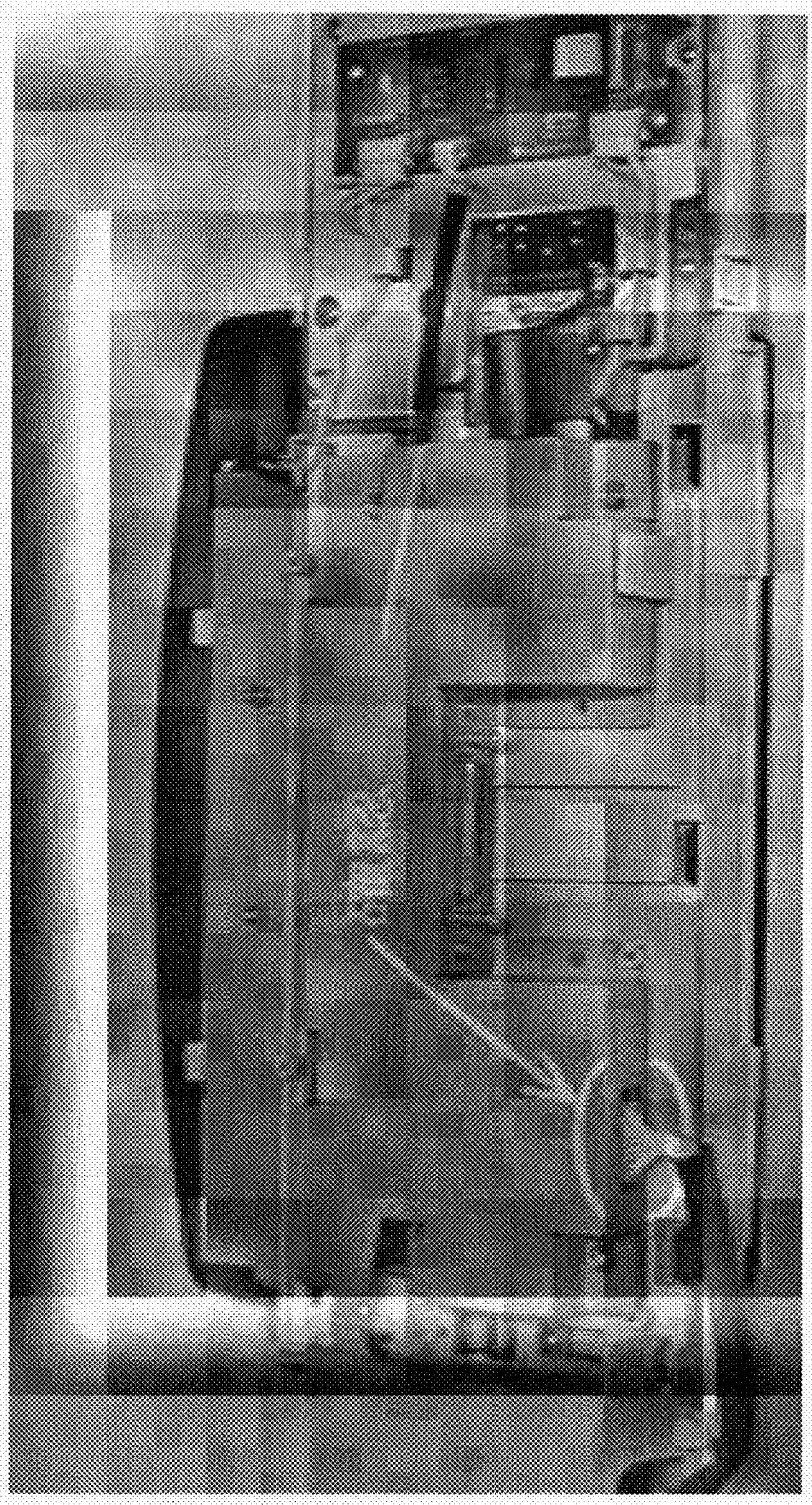
Figure 11D:
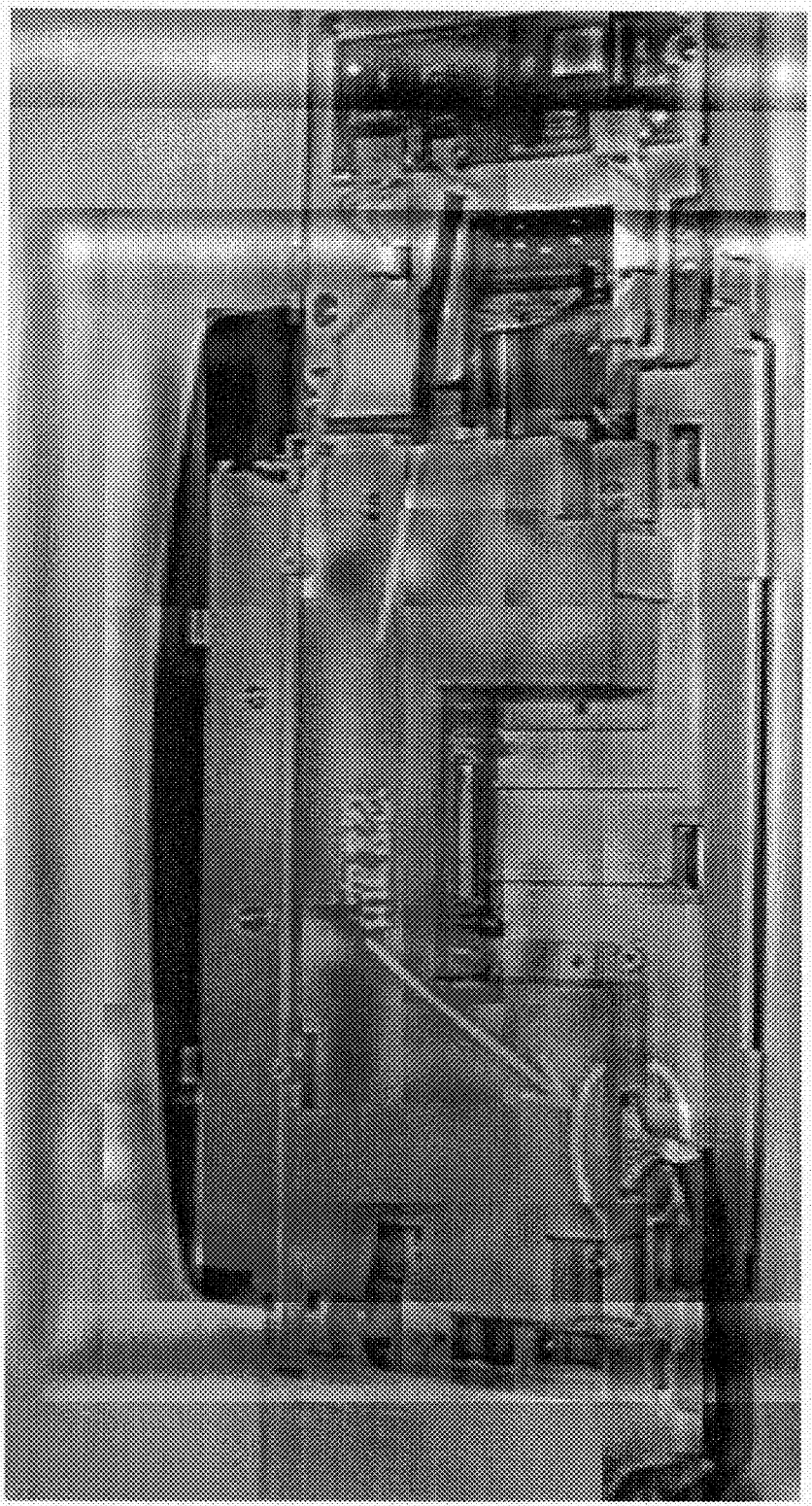
Figure 11E:
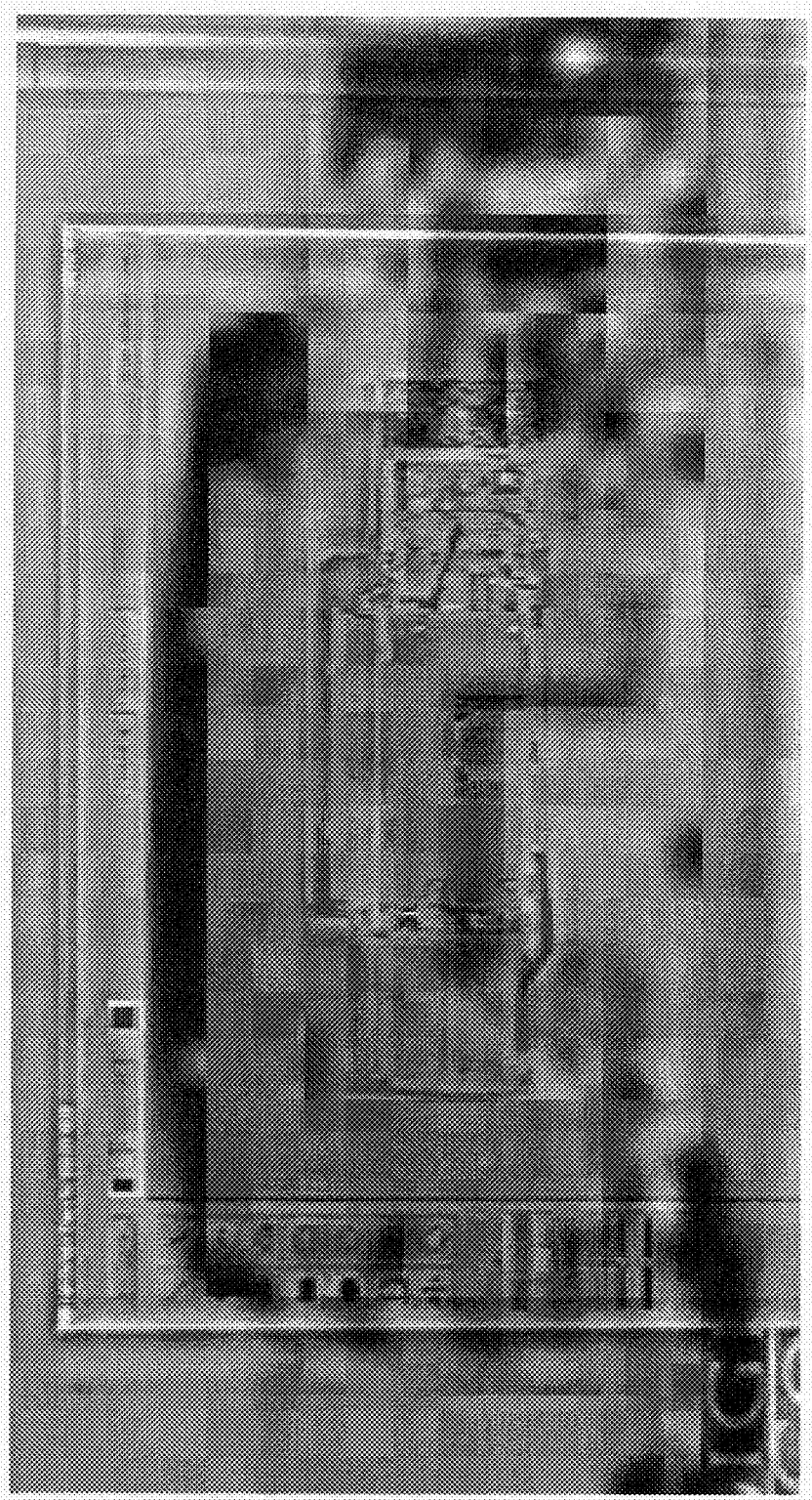

FIGS. 11A to 11E show examples of the reconstruction image obtained by acquiring the image information of the spatial frequency components allocated to the image processing apparatuses 10, which are the nodes 1 to 4, on the basis of the allocation information shown in FIG. 5A and reconstructing the acquired image information. FIG. 11A shows an example of the reconstruction image generated when the images reproduced by all the nodes are identical to each other. FIG. 11B shows an example of the reconstruction image generated when the node 1 displays a different reproduction image. FIG. 11C shows an example of the reconstruction image generated when the node 2 displays a different reproduction image. FIG. 11D shows an example of the reconstruction image generated when the node 3 displays a different reproduction image. FIG. 11E shows an example of the reconstruction image generated when the node 4 displays a different reproduction image.

As shown in FIG. 11A, when the images reproduced by the image processing apparatuses 10 are identical to each other, the reconstruction image obtained by allocating spatial frequency components and reconstructing the spatial frequency components is substantially the same as the original reproduction image. As shown in FIGS. 11B to 11E, when the image reproduced by at least one image processing apparatus 10 is different from those reproduced by other image processing apparatuses 10, the generated reconstruction image is different from the reproduction image. As can be seen from the examples of the reconstruction image, it is possible to easily check whether the images reproduced by the image processing apparatuses 10 are identical to each other by using the display of the reproduction image reconstructed on the basis of the component acquired from each of the image processing apparatuses 10.

Figure 12:
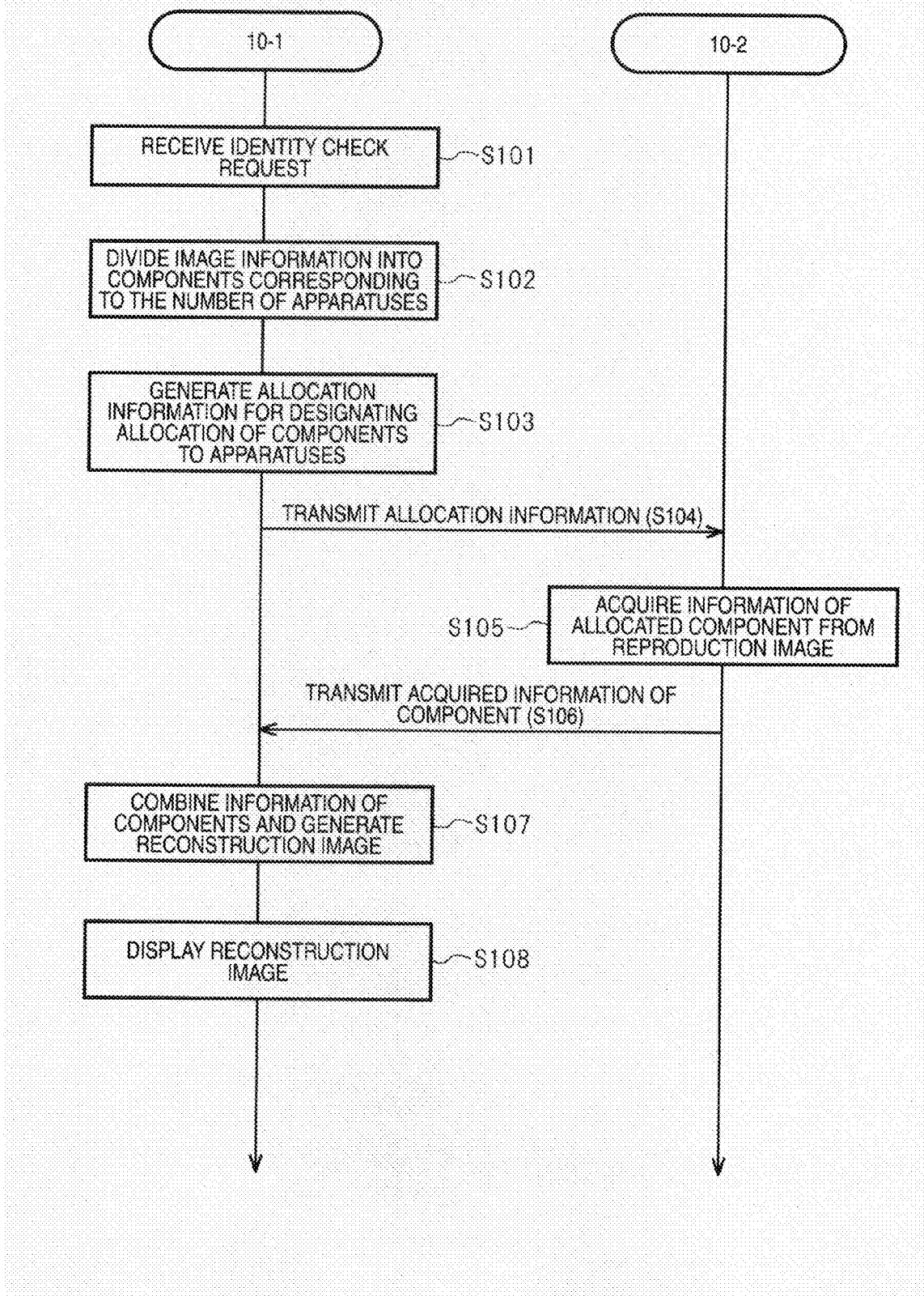
FIG. 12 is a flowchart illustrating the sequence of an identity check process.

FIG. 12 is a flowchart illustrating the sequence of an identity check process of checking the identity of the images reproduced by the image processing apparatuses 10 in the image processing system 1. FIG. 12 shows the process performed between the image processing apparatus 10-1, which is the main node, and the image processing apparatus 10-2, which is the sub-node. However, the same process as that shown in FIG. 12 is performed between the image processing apparatus 10-1 and the image processing apparatuses 10-3, . . . , 10-n, which are the sub-nodes.

First, when the image processing apparatus 10, which is the main node, receives a request for the identity check process from the user (S101), the image processing apparatus 10 divides the image information into components corresponding to the number of image processing apparatuses 10 to be subjected to the identity check process (S102). Then, the image processing apparatus 10 allocates the divided components to the image processing apparatuses 10 and generates allocation information for designating the allocation to the components to each of the image processing apparatuses 10 (S103). The image processing apparatus 10, which is the main node, transmits the generated allocation information to the image processing apparatuses 10, which are the sub-nodes (S104).

Each of the image processing apparatuses 10, which are the sub-nodes, sets the self-allocated component on the basis of the received allocation information and acquires the information of the set component from the image information that is being reproduced (S105). Then, each of the image processing apparatuses 10, which are the sub-nodes, transmits the extracted information of the component to the image processing apparatus 10, which is the main node (S106).

When receiving the information of the components from each of the image processing apparatuses 10, which are the sub-nodes, the image processing apparatus 10, which is the main node, combines the received information of the components with the information of the self-acquired component to generate a reconstruction image (S107). A computer may compare an image displayed thereon, which is a comparison target, with the generated reconstruction image and determine whether the images displayed on the image processing apparatuses 10 are identical to each other, or the user may view the reconstruction image and determine whether the images are identical to each other. In the latter case, the generated reconstruction image is displayed on the display unit 14 (S108). The user views the reconstruction image displayed on the display unit 14 and checks whether the images reproduced by the image processing apparatuses 10 are identical to each other.

In the above-mentioned image processing system 1 according to this exemplary embodiment, the components of one image are allocated to a plurality of image processing apparatuses 10, and the information of the allocated components is acquired from the images reproduced by the image processing apparatuses 10. The acquired information of the components is reconstructed into one image, and the reconstruction image is displayed. Then, it is checked whether the images reproduced by the image processing apparatuses 10 are identical to each other on the basis of one reconstruction image. In this way, it is easy to check the identity of image information reproduced by a plurality of apparatuses.

Next, an example of a process when the invention is applied to a process of checking the identity of moving picture data reproduced by the image processing apparatuses 10 will be described.

First, the image processing apparatus 10, which is the main node, determines the reproduction position of the moving picture data reproduced by each of the image processing apparatuses 10, which is used for the identity check process. For example, when the image processing apparatuses 10 synchronously start the reproduction of the moving picture data, the reproduction position may be designated by the time from the reproduction start time of the moving picture data. Similar to still picture data, the image processing apparatus 10, which is the main node, divides one image information item into a plurality of components and allocates the divided components to the image processing apparatuses 10. The image processing apparatus 10, which is the main node, generates allocation information including reproduction position designation data and the information of the components of the image allocated to the image processing apparatuses 10 and transmits the allocation information to each of the image processing apparatuses 10, which are the sub-nodes.

Each of the image processing apparatuses 10, which are the sub-nodes, receives the allocation information transmitted from the image processing apparatus 10, which is the main node, captures a reproduction image at the reproduction position designated to the moving picture data on the basis of the information included in the received allocation information, and acquires the information of the component allocated to the captured image. Then, each of the image processing apparatuses 10, which are the sub-nodes, transmits the acquired information of the component to the image processing apparatus 10, which is the main node.

The image processing apparatus 10, which is the main node, reconstructs the reproduction image to generate a reconstruction image on the basis of the information of the component allocated to the moving picture data to be reproduced and the information of the component received from each of the image processing apparatuses 10, which are the sub-nodes. Then, the image processing apparatus 10, which is the main node, displays the generated reconstruction image on the display unit 14. The user checks the identity of the images reproduced by the image processing apparatuses 10 on the basis of the displayed reconstruction image. The designation of the reproduction position is not limited to the above. For example, time synchronization may be performed between the image processing apparatuses 10, and the reproduction position may be designated by time.

The invention is not limited to the above-described exemplary embodiment. For example, each of the image processing apparatuses 10, which are the sub-nodes, as well as the main node may check the identity. In this case, when allocating the components, the image processing apparatus 10, which is the main node, transmits information acquired from the information of the component allocated to the main node to each of the image processing apparatuses 10, which are the sub-nodes. Then, each of the image processing apparatuses 10, which are the sub-nodes, transmits information acquired from the allocated component to other image processing apparatuses 10, which are the sub-nodes, as well as the main node. In addition, in the above-described exemplary embodiment, the user checks the identity of the images. However, the image processing apparatus 10 may acquire the difference between the reconstruction image and the reproduction image that is being reproduced and use the difference to determine the identity of images.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
a display that displays a first image;
an allocating unit that divides image information of the first image into components corresponding to a plurality of apparatuses, each of which reproduces the first image as a reproduced image and displays the reproduced image, and allocates the components to the plurality of apparatuses;
an information acquiring unit that acquires component information of the reproduced images displayed by the plurality of apparatuses that corresponds to the components allocated by the allocating unit, the component information generated by the plurality of apparatuses based on (i) the allocated components and (ii) the reproduced images displayed by the plurality of apparatuses; and
an image generating unit that combines the component information acquired from the plurality of apparatuses by the information acquiring unit and generates a reconstructed first image,
wherein the components comprise a red (R) color component, a green (G) color component, and a blue (B) color component of the image information,
wherein when all reproduced images displayed by the plurality of apparatuses are the same as the first image, the reconstructed first image is identical to the first image, and when any one of the reproduced images displayed by the plurality of apparatuses is different from the first image, the reconstructed first image is not identical to the first image.

2. An image processing system comprising:
a plurality of image processing apparatuses,
wherein at least one of the plurality of image processing apparatuses includes:
a display that displays a first image; and
an allocating unit that divides image information of the first image into components corresponding to the plurality of image processing apparatuses, each of which reproduces the first image as a reproduced image and displays the reproduced image, and allocates the components to the plurality of image processing apparatuses, and
each of the plurality of image processing apparatuses includes:
a reproducing unit that reproduces the image information; and
a second information acquiring unit that acquires component information of the reproduced images corresponding to the allocated components from the image information reproduced by the reproducing unit,
wherein the at least one of the plurality of image processing apparatuses further includes:
a first information acquiring unit that acquires the component information of the reproduced images reproduced by the plurality of image processing apparatuses that corresponds to the components allocated by the allocating unit, the component information generated by the plurality of image processing apparatuses based on (i) the allocated components and (ii) the reproduced images reproduced by the plurality of apparatuses; and
an image generating unit that combines the component information acquired from the plurality of image processing apparatuses by the first information acquiring unit and generates a reconstructed first image, and
wherein the components comprise a red (R) color component, a green (G) color component, and a blue (B) color component of the image information,
wherein if all reproduced images reproduced by the plurality of apparatuses are the same as the first image, the reconstructed first image is identical to the first image, and if any one of the reproduced images reproduced by the plurality of apparatuses is different from the first image, the reconstructed first image is not identical to the first image.

3. The image processing system according to claim 2, wherein the reproducing unit reproduces moving picture information, the allocating unit designates a reproduction position of the moving picture information, and the second information acquiring unit acquires the component information from the image information reproduced based on the moving picture information at the designated reproduction position.

4. A non-transitory computer readable medium storing a program causing a computer to execute a process for checking image information, the process comprising:
displaying a first image;
dividing the image information of the first image into components corresponding to a plurality of apparatuses, each of which reproduces the first image as a reproduced image and displays the reproduced image;
allocating the components to the plurality of apparatuses;
acquiring component information of the reproduced images displayed by the plurality of apparatuses that corresponds to the allocated components, the component information generated by the plurality of apparatuses based on (i) the allocated components and (ii) the reproduced images displayed by the plurality of apparatuses; and
combining the component information acquired from the plurality of apparatuses and generating a reconstructed first image,
wherein the components comprise a red (R) color component, a green (G) color component, and a blue (B) color component of the image information,
wherein when all reproduced images displayed by the plurality of apparatuses are the same as the first image, the reconstructed first image is identical to the first image, and when any one of the reproduced images displayed by the plurality of apparatuses is different from the first image, the reconstructed first image is not identical to the first image.

5. An image processing apparatus comprising:
a display that displays a first image;
an allocating unit that divides image information of the first image into components corresponding to a plurality of apparatuses, each of which reproduces the first image as a reproduced image and displays the reproduced image, and allocates the components to the plurality of apparatuses;
an information acquiring unit that acquires component information of the reproduced images displayed by the plurality of apparatuses that corresponds to the components allocated by the allocating unit, the component information generated by the plurality of apparatuses based on (i) the allocated components and (ii) the reproduced images displayed by the plurality of apparatuses;
an image generating unit that combines the component information acquired from the plurality of apparatuses by the information acquiring unit and generates a reconstructed first image;
and
a determination unit that determines whether the reconstructed first image generated by the image generating unit is identical to the first image, wherein the components comprise a red (R) color component, a green (G) color component, and a blue (B) color component of the image information, wherein when all reproduced images displayed by the plurality of apparatuses are the same as the first image, the reconstructed first image is identical to the first image, and when any one of the reproduced images displayed by the plurality of apparatuses is different from the first image, the reconstructed first image is not identical to the first image.

6. The image processing apparatus according to claim 1, wherein the allocating unit dividing the image information and allocating the components comprises selecting a first component of image data and a second component of the image data and allocating the first component to the image processing apparatus and the second component to a second image processing apparatus, wherein the information acquiring unit acquiring the component information comprises acquiring a first portion of the image data having the first component, wherein the image processing apparatus further comprises a communication unit that receives from the second image processing apparatus a second portion of the image data having the second component, and wherein the image generating unit combining the information comprises combining the first portion of the image data and the second portion of the image data, as reconstructed image data of the reconstructed first image.

7. The image processing system according to claim 2, wherein the allocating unit dividing the image information and allocating the components comprises selecting a plurality of components of image data, a number of the plurality of components equal to a number of the plurality of image processing apparatuses, and respectively allocating a different one of the plurality of components to the plurality of image processing apparatuses, wherein the reproducing unit reproduces the image data, wherein the second information acquiring unit acquiring the component information comprises acquiring the component information that indicates the allocated different one of the plurality of components and obtaining from the image data reproduced by the reproducing unit a portion of the image data having the allocated different one of the plurality of components, wherein first information acquiring unit acquiring the component information comprises acquiring from the plurality of image processing apparatuses the portions of the image data having the allocated different ones of the plurality of components acquired by the second information acquiring units of the plurality of image processing apparatuses, and wherein the image generating unit combining the information comprises combining the portions of the image data having the allocated different ones of the plurality of components, as the reconstructed first image.

8. The non-transitory computer readable medium according to claim 4, wherein the dividing comprises selecting a first component of image data and a second component of the image data, wherein the allocating comprises allocating the first component to a first image processing apparatus and the second component to a second image processing apparatus, wherein the acquiring comprises acquiring a first portion of the image data having the first component, wherein the method further comprises receiving from the second image processing apparatus a second portion of the image data having the second component, and wherein the combining comprises combining the first portion of the image data and the second portion of the image data, as reconstructed image data of the reconstructed first image.

9. The image processing apparatus according to claim 5, wherein the allocating unit dividing the image information and allocating the components comprises selecting a first component of image data and a second component of the image data and allocating the first component to the image processing apparatus and the second component to a second image processing apparatus, wherein the information acquiring unit acquiring the information comprises acquiring acquires a first portion of the image data having the first component, wherein the image processing apparatus further comprises a communication unit that receives from the second image processing apparatus a second portion of the image data having the second component, and wherein the image generating unit combining the information comprises combining the first portion of the image data and the second portion of the image data, as reconstructed image data of the reconstructed first image.

10. The image processing apparatus according to claim 1, wherein the allocating unit allocates the components according to an allocation information table that stores the components associated with a time at which the components are allocated to the plurality of apparatuses.

11. The image processing apparatus according to claim 1, wherein the allocating unit allocates the components according to an allocation information table that stores the components associated with a time at which the components are allocated to the plurality of apparatuses, and wherein each of the components are allocated to the plurality of apparatuses based on a change in the time.

12. An image processing apparatus comprising:

a display that displays a first image;

an allocating unit that divides image information of the first image into components corresponding to a plurality of apparatuses, each of which reproduces the first image as a reproduced image and displays the reproduced image, and allocates the components to the plurality of apparatuses;

an information acquiring unit that acquires component information of the reproduced images displayed by the plurality of apparatuses that corresponds to the components allocated by the allocating unit, the component information generated by the plurality of apparatuses based on (i) the allocated components and (ii) the reproduced images displayed by the plurality of apparatuses; and an image generating unit that combines the component information acquired from the plurality of apparatuses by the information acquiring unit and generates a reconstructed first image, wherein the components comprise spatial frequency components of pixels of the image information, wherein when all reproduced images displayed by the plurality of apparatuses are the same as the first image, the reconstructed first image is identical to the first image, and when any one of the reproduced images displayed by the plurality of apparatuses is different from the first image, the reconstructed first image is not identical to the first image.

13. An image processing apparatus comprising:
a processor that controls the image processing apparatus to function as:
an allocating unit that allocates a first image component to a first apparatus and a second image component to a second apparatus;
a component receiving unit that receives from the first apparatus the first image component of a first image that is reproduced by the first apparatus and receives from the second apparatus the second image component of a second image that is reproduced by the second apparatus;
an image generating unit that combines the first image component and the second image component as a reconstructed image; and
an image comparison unit that determines whether the reconstructed image is identical to an original image, and determines that the first apparatus and the second apparatus accurately reproduces the original image in response to determining that the reconstructed image is identical to the original image.

14. The image processing apparatus according to claim 13, wherein when the first image that is reproduced by the first apparatus and the second image that is reproduced by the second apparatus are the same as the original image, the reconstructed image is identical to the original image, and when any one of the first image that is reproduced by the first apparatus and the second image that is reproduced by the second apparatus is different from the original image, the reconstructed image is not identical to the original image.

15. The image processing apparatus according to claim 13, wherein the first image component and the second image component are portions of the original image that are less than the entire original image.

16. The image processing apparatus according to claim 15, wherein the first image component comprises one of a red (R) color component, a green (G) color component, and a blue (B) color component, and the second image component comprises another one of the RGB color components.

17. The image processing apparatus according to claim 15, wherein the first image component comprises a first region of the original image and the second image component comprises a second region of the original image.

18. The image processing apparatus according to claim 15, wherein the first image component comprises a first spatial frequency component of the original image and the second image component comprises a second spatial frequency component of the original image.

* * * * *